(12) United States Patent  
Ikeda et al.

(10) Patent No.: US 7,925,093 B2  
(45) Date of Patent: Apr. 12, 2011

(54) IMAGE RECOGNITION APPARATUS

(75) Inventors: Hitoshi Ikeda, Kanagawa (JP); Noriji Kato, Kanagawa (JP); Masahiro Maeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/591,541

(22) Filed: Nov. 23, 2009

(65) Prior Publication Data

US 2010/0074529 A1  Mar. 25, 2010

Related U.S. Application Data

(62) Division of application No. 11/010,432, filed on Dec. 14, 2004, now Pat. No. 7,646,915.

(30) Foreign Application Priority Data

Apr. 21, 2004  (JP) .................. 2004-125814

(51) Int. Cl.  
*G06K 9/00* (2006.01)  
*H04N 5/225* (2006.01)

(52) U.S. Cl. .............. 382/190; 382/118; 348/207.99

(58) Field of Classification Search .......... 382/110, 382/100, 118, 190, 127, 154, 294, 296, 218, 382/199, 288, 181, 195, 276, 293, 209, 217, 382/286; 348/42, 351, 354, E5.045, 356, 348/207.99, 335, 345, 349; 358/448, 452, 358/453, 471; 399/130, 297, 310, 159, 166  
See application file for complete search history.

(56) References Cited

U.S. PATENT DOCUMENTS

| 6,252,976 | B1 * | 6/2001 | Schildkraut et al. .......... 382/117 |
| 6,292,575 | B1 | 9/2001 | Bortolussi et al. |
| 6,571,002 | B1 | 5/2003 | Ogawa |
| 6,611,613 | B1 | 8/2003 | Kang et al. |
| 6,714,665 | B1 | 3/2004 | Hanna et al. |
| 6,807,290 | B2 * | 10/2004 | Liu et al. ....................... 382/118 |
| 6,879,709 | B2 * | 4/2005 | Tian et al. ..................... 382/118 |

(Continued)

FOREIGN PATENT DOCUMENTS

JP  07-302327  * 11/1995

(Continued)

OTHER PUBLICATIONS

Notification of Reason for Refusal issued in Japanese Patent Application No. 2004-125814; Jan. 5, 2010; with English-language translation.

*Primary Examiner* — Sheela C Chawan  
(74) *Attorney, Agent, or Firm* — Oliff & Berridge, PLC (57) ABSTRACT

An image recognition apparatus includes an objective image data acquisition unit to acquire objective image data containing a face image portion, a feature area detection unit to detect an eye area corresponding to left and right eyes contained in the objective image data, an inclination estimation unit to estimate inclination of the face image portion in a depth direction thereof based on the relative position of the detected eye area, an area-to-be-extracted determination unit to determine a shape of an area to be extracted in response to the inclination estimated by the inclination estimation unit, and an area-to-be-extracted extraction unit to extract the area to be extracted of the shape determined from the objective image data. Preferably, the area to be extracted is subjected to predetermined processing.

2 Claims, 6 Drawing Sheets

U.S. PATENT DOCUMENTS

| | | | |
|---|---|---|---|
| 6,885,761 B2 * | 4/2005 | Kage | 382/118 |
| 6,937,745 B2 | 8/2005 | Toyama | |
| 6,965,684 B2 * | 11/2005 | Chen et al. | 382/103 |
| 7,298,930 B1 * | 11/2007 | Erol et al. | 382/305 |
| 7,310,446 B2 | 12/2007 | Kato et al. | |
| 7,321,670 B2 | 1/2008 | Yoon et al. | |
| 7,324,670 B2 | 1/2008 | Kozakaya et al. | |
| 7,697,765 B2 * | 4/2010 | Matsugu et al. | 382/225 |

FOREIGN PATENT DOCUMENTS

| | | | |
|---|---|---|---|
| JP | A 7-302327 | | 11/1995 |
| JP | 11-281661 | * | 10/1999 |
| JP | A 11-281661 | | 10/1999 |
| JP | A-2003-281541 | | 10/2002 |
| JP | A 2003-346158 | | 12/2003 |

* cited by examiner

IMAGE RECOGNITION APPARATUS

This is a Division of application Ser. No. 11/010,432 filed Dec. 14, 2004. The disclosure of the prior application is hereby incorporated by reference herein in its entirety.

BACKGROUND OF THE INVENTION

1. Field of the Invention

This invention relates to an image recognition apparatus, an image extraction apparatus, an image extraction method, and a program for recognizing the object of a face, etc.

2. Description of the Related Art

A system for conducting individual authentication by recognizing the face of an individual has captured attention with an increase in demand for security improvement by individual authentication in recent years.

Such an individual authentication system based on a face adopts a method for enhancing the accuracy of face recognition by detecting variation such as rotation of a face image or a shift from the center thereof, for example, as disclosed in JP-A-2003-281541.

Specifically, for example, in the method as disclosed in JP-A-2003-281541, to recognize variation of the face image, first a feature pattern (positions of eyes, position of mouth, etc.,) is extracted based on the feature amount of entropy, etc., for each area of the sample face image of the individual to be recognized. The feature pattern is stored as coordinates when it is projected onto a subspace. When the face is recognized, the feature pattern is extracted in a similar manner from the input face image of the individual. When the feature pattern is projected onto the subspace, if the degree of similarity between the projection and the projection of the stored feature pattern exceeds a threshold value, it is recognized that the input face image and the stored face image are the face images of the identical person.

At the time, however, high accuracy may not be provided because of variation such as inclination of the face. Then, using a large number of intentionally varied face images as teacher signals, variation examples of face images cause a neural net to learn and the feature patterns are input to the neural net, whereby normalized images with the effects of the variations removed are obtained.

Figure 9:
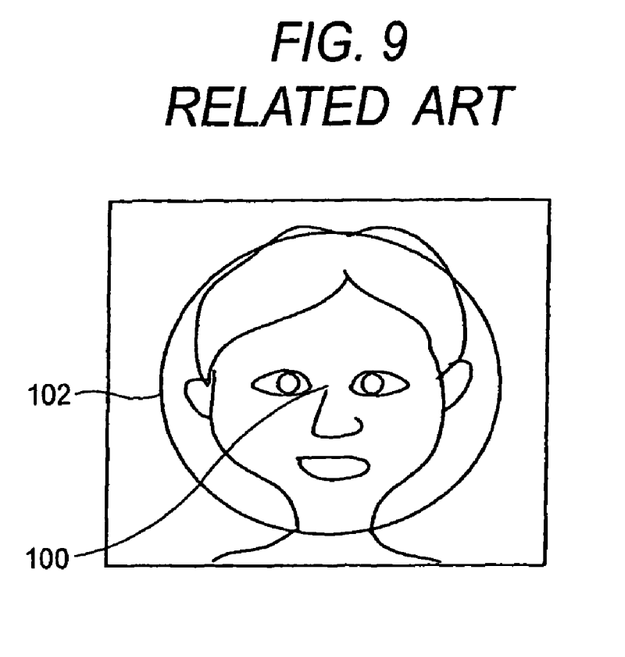
FIG. 9 is a schematic representation of a method of extracting an area to be extracted from objective image data according to a related art.

The face image is obtained by cutting out objective image data as a complete round 102 with the midpoint between two eyes detected by calculating entropy for each partial area of the objective image data as a center 100, for example, as shown in FIG. 9. Here, the reason why a complete round is adopted is that cutting out the face of a human being as a complete round is a sufficient condition for extracting the necessary portion for feature pattern extraction from the face image. According to the former understanding, it was considered that if a background is entered, the accuracy of learning/recognition does not change as a result of forming subspace and learning by the neural net.

Figure 10:
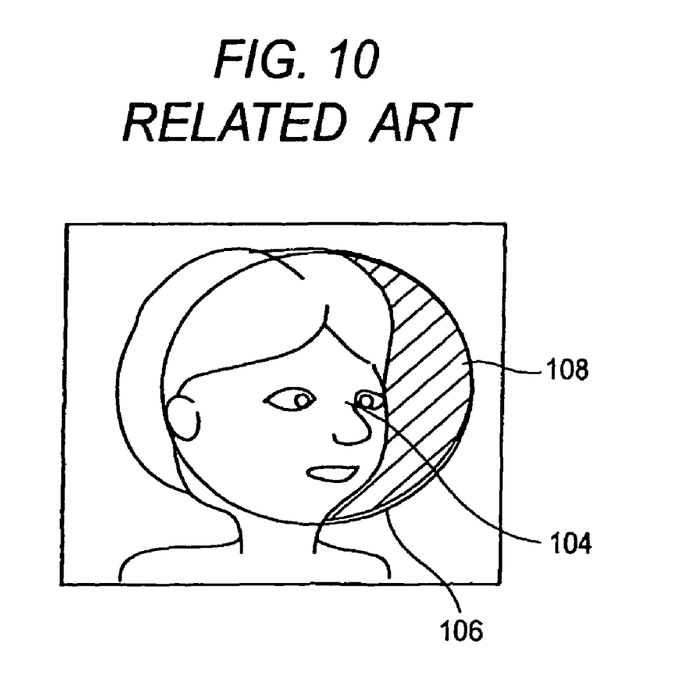
FIG. 10 is a schematic representation of a method of extracting an area to be extracted from objective image data according to a related art.

In fact, however, for example, as shown in FIG. 10, when the face does not face the front, if the image is cut out as a complete round 106 with the midpoint between two eyes as a center 104 as described above, a portion 108 other than the face portion (usually, background portion) is contained in the cut-out image and the effect of the background may make it difficult to extract a feature pattern or cause a large error to occur in extracting a feature pattern. Then, since the feature pattern input to the neural net has a large error, it becomes impossible to learn with good accuracy in a learning scene and it becomes impossible to provide significant output if normalization with the neural net is conducted in a recognition scene. Further, projection of the feature pattern onto subspace is also adversely affected.

SUMMARY OF THE INVENTION

According to an aspect of the present invention, an image recognition apparatus includes an objective image data acquisition unit to acquire objective image data containing a face image portion, a feature area detection unit to detect an eye area corresponding to left and right eyes contained in the objective image data, an inclination estimation unit to estimate inclination of the face image portion in a depth direction thereof based on the relative position of the detected eye area, an area-to-be-extracted determination unit to determine a shape of an area to be extracted in response to the inclination estimated by the inclination estimation unit, and an area-to-be-extracted extraction unit to extract the area to be extracted of the shape determined from the objective image data. Preferably, the area to be extracted is subjected to predetermined processing.

According to another aspect of the present invention, an image extraction apparatus includes an objective image data acquisition unit to acquire objective image data containing an attention portion, an inclination estimation unit to estimate inclination of the attention portion in a depth direction thereof, and an area-to-be-extracted extraction unit to extract an area to be extracted determined in response to the estimated inclination from the objective image data.

According to yet another aspect of the present invention, an image extraction method includes acquiring objective image data containing an attention portion, estimating inclination of the attention portion in a depth direction thereof, and extracting an area to be extracted determined in response to the estimated inclination from the objective image data.

According to still another aspect of the present invention, a storage medium readable by a computer, the storage medium storing a program of instructions executable by the computer to perform a function for extracting an image, the function includes the steps of acquiring objective image data containing an attention portion, estimating inclination of the attention portion in a depth direction thereof, and extracting an area to be extracted determined in response to the estimated inclination from the objective image data.

BRIEF DESCRIPTION OF THE DRAWINGS

Preferred embodiments of the present invention will be described in detail based on the following figures, wherein.

DETAILED DESCRIPTION OF THE INVENTION

Referring now to the accompanying drawings, there is shown a preferred embodiment of the invention.

Figure 1:
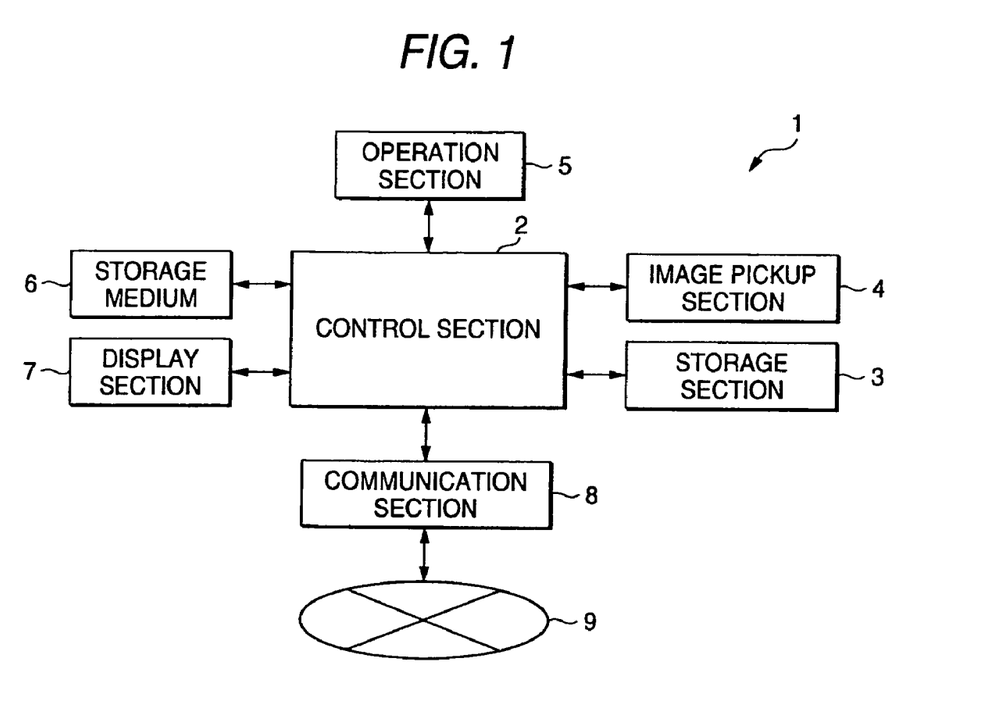
FIG. 1 is a hardware block diagram of a computer according to an embodiment of the invention.

A computer 1 used as an image recognition apparatus according to the embodiment of the invention is made up of a control section 2, a storage section 3, an image pickup section 4, an operation section 5, a storage medium 6, a display section 7, and a communication section 8, as shown in FIG. 1. The control section 2 controls the sections of the computer 1. The storage section 3 operates as work memory of the control section 2. The storage section 3 also retains programs and parameters involved in various types of processing performed by the control section 2. The operation section 5 includes a mouse and a keyboard, for example, it accepts input from the user of the computer 1 and outputs the user's input to the control section 2. The display section 7 includes a liquid crystal display, for example, and displays information in accordance with a signal input from the control section 2. The storage medium 6 stores a program according to the embodiment, for example, and the control section 2 expands the program in the storage section 3 for execution. The image pickup section 4 includes a camera, for example, and outputs an image picked up by the camera to the control section 2. The communication section 8, which is connected to a network 9, transmits various signals to the network 9 as instructed by the control section 2 and outputs various received signals to the control section 2.

Figure 2:
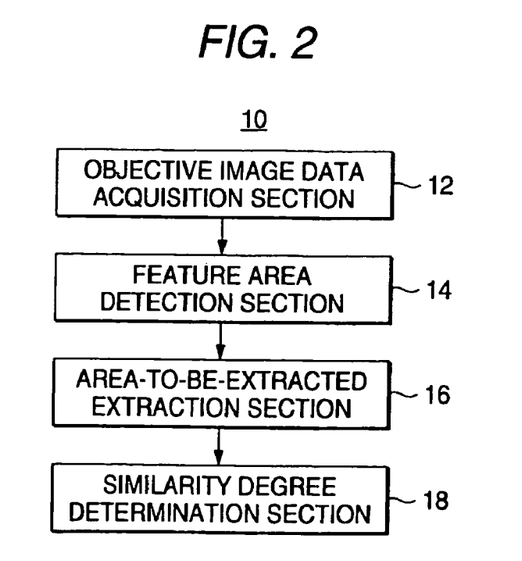
FIG. 2 is a functional block diagram of an image recognition apparatus according to the embodiment of the invention.

Next, FIG. 2 is a functional block diagram applied when the computer 1 is used as an image recognition apparatus 10. As shown in FIG. 2, the image recognition apparatus 10 according to the embodiment is made up of an objective image data acquisition section 12, a feature area detection section 14, an area-to-be-extracted extraction section 16, and a similarity degree determination section 18.

The objective image data acquisition section 12 acquires objective image data to which processing of individual authentication, etc., is applied. Specifically, the objective image data may be acquired, for example, by taking a photograph of a human being standing in front of the camera in the image pickup section 4 included in the computer 1 or may be acquired in the communication section 8, for example, from a server on the network through the communication section. Here, it is assumed that the objective image data contains the face image portion of a human being as an attention portion. The objective image data acquisition section 12 outputs the objective image data to the feature area detection section 14.

The feature area detection section 14 detects a feature area contained in the objective image data input from the objective image data acquisition section 12. The feature area is an area corresponding to each eye of a human being, for example. In this case, the feature area detection section 14 detects the eye area corresponding to the eye. As a method of detecting the feature area, a known detection method using entropy calculation is preferred.

Figure 5:
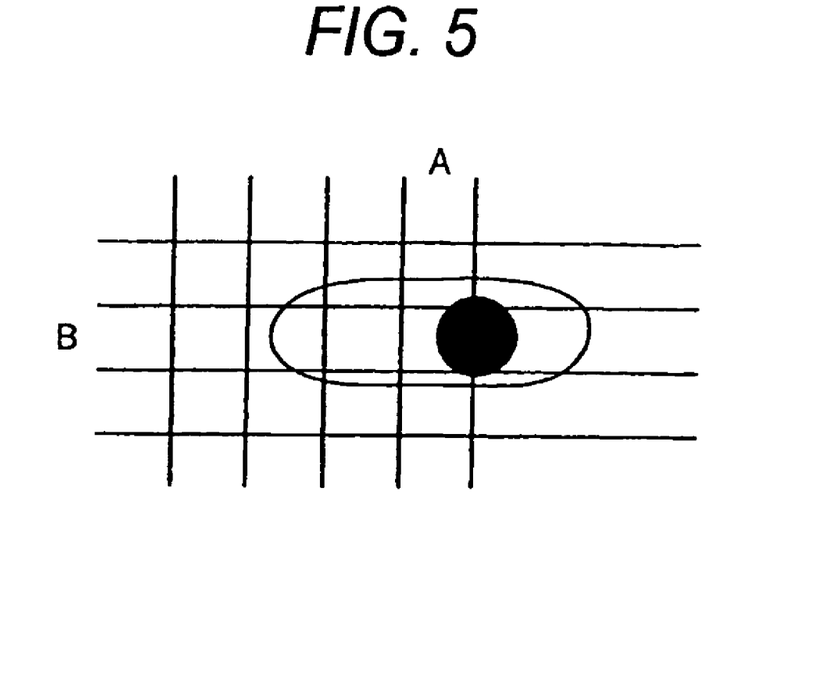
FIG. 5 is a schematic representation of entropy calculation according to the embodiment of the invention.
Figure 6:
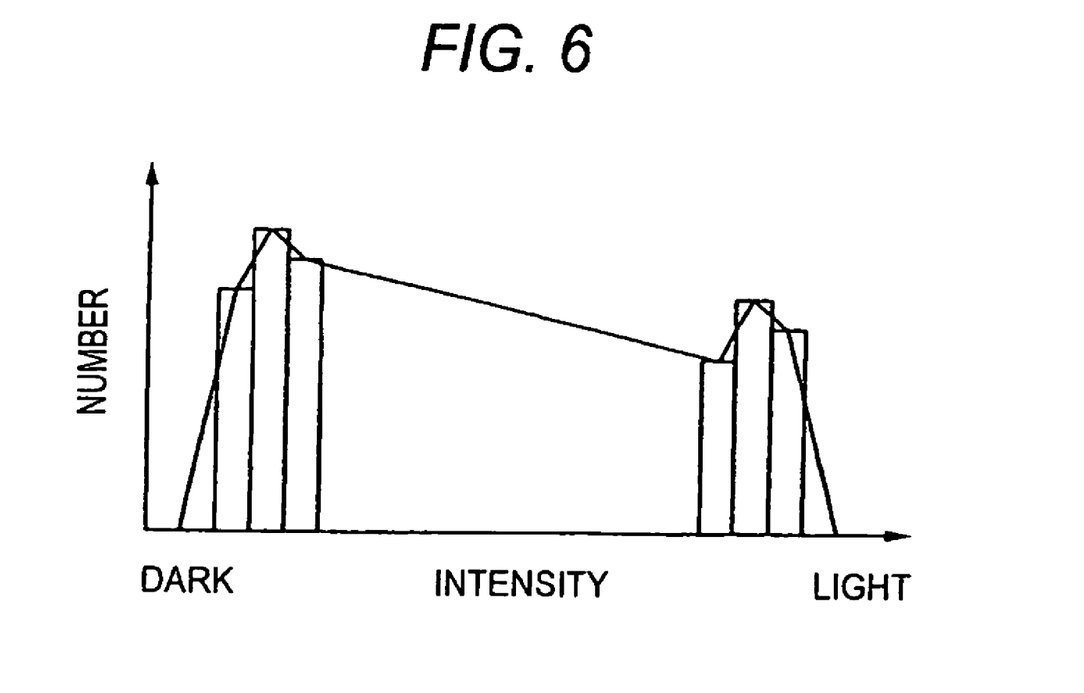
FIG. 6 is a schematic representation of entropy calculation by linear interpolation approximation according to the embodiment of the invention.

An example of the feature area detection method using entropy calculation will be briefly discussed by taking detection of an eye as an example. This detection method uses a feature that the eye area has a large contrast between dark and white portions of the eye. As shown in FIG. 5, the objective image data is separated like a lattice and entropy in each cell is calculated (FIG. 5 shows only the eye portion contained in the objective image data). Specifically, for example, entropy can be calculated based on the intensity of each pixel in the cell. That is, as shown in FIG. 6, the intensity of each pixel is put into a histogram. FIG. 6 shows an example of a histogram of the cell at the intersection point of A and B in FIG. 5. Since the dark portion of the eye has intensity of "dark" and the white portion of the eye has intensity of "light," the histogram is leaning to "light" and "dark" and a pixel corresponding to intermediate intensity does not exist. The results of approximating the histogram by linear interpolation approximation are integrated. In FIG. 6, the linear interpolation approximation line is a polygonal line connecting the summits of the histogram. Here, the summits of the portions with the number of pixels being equal to or less than a predetermined threshold value are ignored. In doing so, the more uneven the intensity distribution of the pixels, the greater the integrating result. Then, the inverse element in addition of the integrating result is handled as entropy, whereby the entropy in each cell can be calculated. This is an example of simple entropy calculation, letting the occurrence probability of each intensity be $p_i$ (where i corresponds to each intensity), the entropy may be calculated as $-\Sigma (p_i \times \log (p_i))$, of course.

In the face image of a human being, in a large-contrast portion such as the eye portion, the entropy becomes small because the intensity difference between the pixels contained in a cell like the cell at the intersection point of A and B in FIG. 5. The entropy of each pixel is thus calculated, whereby the eye portion can be detected. The detected feature area data is output to the area-to-be-extracted extraction section 16.

Figure 3:
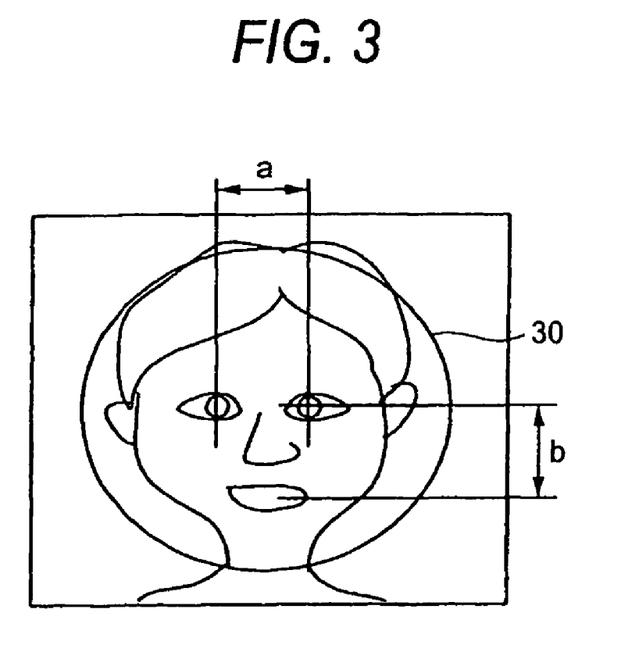
FIG. 3 is a schematic representation of a method of extracting an area to be extracted from objective image data according to the embodiment of the invention.
Figure 4:
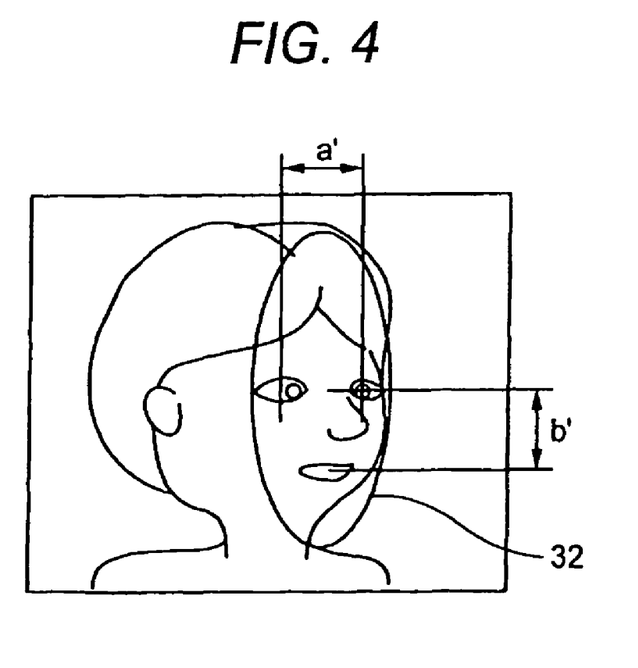
FIG. 4 is a schematic representation of a method of extracting an area to be extracted from objective image data according to the embodiment of the invention.

The area-to-be-extracted extraction section 16 receives the feature area data output by the feature area detection section 14 and acquires the inclination of the attention portion in the depth direction thereof based on the feature area. That is, usually one face image contains two left and right eyes and the inclination of the face image of the attention portion in the depth direction thereof is acquired based on the relative positions of the feature areas considered to be the left and right eyes. FIGS. 3 and 4 show a specific example. FIG. 3 shows the case where the face image faces the front and FIG. 4 shows the case where the face image is inclined in the depth direction.

In FIG. 3, the distance between the detected eye areas is a. In FIG. 4, the distance between the detected eye areas is a'. When the face inclination is θ in the depth direction, the relation represented by the following expression (1) holds between a and a':

(Expression 1)

$$a' = a \times \cos \theta \quad (1)$$

Assuming that the eye distance a of the face of a human being is mostly constant regardless of who the human being is, the inclination θ of the face in the depth direction thereof can be estimated according to expression (1) by measuring a' representing the relative positions of the two eye areas.

To more precisely estimate the inclination of the face in the depth direction thereof, more preferably, not only the eye areas, but also a mouth area is detected as the feature area. The mouth area can also be detected by the detection method using entropy calculation like the eye areas. In FIG. 3, the distance between the midpoint between the eye areas and the mouth area is b. In FIG. 4, the distance between the midpoint between the eye areas and the mouth area is b'. When the face inclination is θ in the depth direction, the relation represented by the following expression (2) holds:

(Expression 2)

$$a'/b' = (a/b) \times \cos \theta \quad (2)$$

In doing so, the effect of the distance from the camera to the face, for example, can be eliminated. It can be assumed that a/b is mostly constant regardless of who the human being is rather than it is assumed that the eye distance a of the face of a human being is mostly constant regardless of who the human being is, the inclination θ can be estimated more precisely.

If the inclination θ can be estimated, the shape of the area to be extracted is determined in response to the inclination and the area to be extracted is extracted from the objective image data. Specifically, the shape may be determined by determining the width of the area to be extracted in response to the inclination θ. That is, when the attention portion is inclined relative to the depth direction, if the area to be extracted is the complete round 106, a portion other than the attention portion is contained, for example, as shown in FIG. 10, however, the shape is determined so that the width of the area to be extracted reduces, namely, the area to be extracted is an ellipse 32, whereby any other portion than the attention portion can be excluded from the area to be extracted, as shown in FIG. 4. That is, if the attention portion faces the front, the area to be extracted is a complete round 30 as shown in FIG. 3, if the attention portion is inclined in the depth direction, the area to be extracted is an ellipse 32 provided by reducing the width of the complete round 30 in response to the inclination as shown in FIG. 4.

The area to be extracted need not necessarily be an ellipse. That is, an area containing an area to extract a feature vector used in the similarity degree determination section 18 described later may be able to be the area to be extracted and thus the area to be extracted may be a rectangle, for example. In this case, as the width of the rectangle is reduced, any other portion than the attention portion can be excluded from the area to be extracted. The expression "any other portion than the attention portion is excluded from the area to be extracted" does not mean that the area to be extracted does not contain any other portion than the attention portion and means that the area to be extracted does not contain other portions than the attention portion to such an extent that the effect on learning or recognition in the similarity degree determination section 18 described later can be decreased. Likewise, the inclination θ need not strictly be estimated either and may be able to be estimated to such an extent that the effect on learning or recognition in the similarity degree determination section 18 described later can be decreased. The extracted area-to-be-extracted data is output to the similarity degree determination section 18.

The similarity degree determination section 18 performs predetermined processing for the area-to-be-extracted data output by the area-to-be-extracted extraction section 16, thereby conducting individual authentication based on the attention portion contained in the area to be extracted. The predetermined processing performed for the area-to-be-extracted data extracted by the area-to-be-extracted extraction section 16 is known as so-called pattern recognition processing. The pattern recognition processing is processing of associating the image of the attention portion contained in the area to be extracted with one of previously learnt template image data pieces. An outline of an example of the pattern recognition processing is given below.

First, a feature vector is extracted from the image in the area to be extracted. For example, assuming that d features are used as the features representing a pattern representing the image in the area to be extracted, the feature vector becomes a d-dimensional vector.

The similarity degree between the feature vector and the feature vector of each template image data extracted in a similar manner from the template image data is calculated. To calculate the similarity degree, various methods are proposed, for example, a nearest neighbor decision rule for determining the similarity degree by the distance between the feature vector on the feature space of the space provided by the feature space and the feature vector of each template image data, a discriminant function method (perceptron) for storing the weighting factor for each template image data and determining the similarity degree based on the value of the inner product of the weighting factor and the feature vector, a subspace method for focusing only on the subspaces generated using an auto coder for causing the neural net to learn the weighting factor or the feature vector of template image data and determining the similarity degree, and the like can be named. In every method, the similarity degree determination section 18 stores information concerning the template image data and determines the similarity degree based on the information concerning the template image data and the feature vector extracted from the image in the area to be extracted.

An example of specific processing of the similarity degree determination section 18 will be discussed in detail with reference to FIG. 8.

Figure 8:
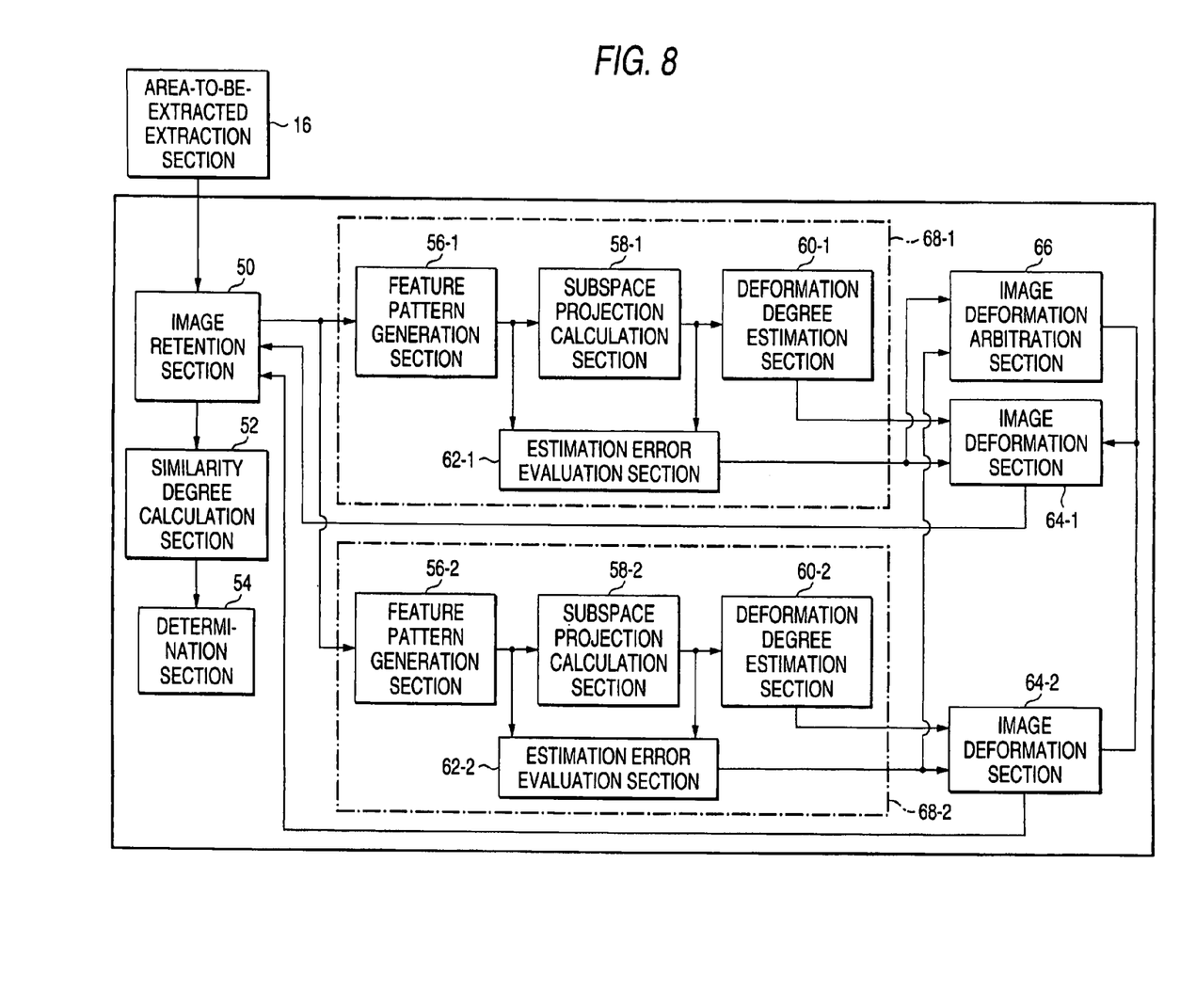
FIG. 8 is a functional block diagram of a similarity degree determination section according to the embodiment of the invention.

FIG. 8 is a detailed functional block diagram of the processing in the similarity degree determination section 18. The similarity degree determination section 18 is made up of an image retention section 50, a similarity degree calculation section 52, a determination section 54, a feature pattern generation section 56, a subspace projection calculation section 58, a deformation degree estimation section 60, an estimation error evaluation section 62, an image deformation section 64, and an image deformation arbitration section 66. The functional sections are connected as in FIG. 8. The feature pattern generation section 56, the subspace projection calculation section 58, the deformation degree estimation section 60, the estimation error evaluation section 62, and the image deformation section 64 make up an image deformation degree estimation section 68. Usually, plural image deformation degree estimation sections 68 are provided each for each type of feature pattern.

The image retention section 50 retains the area-to-be-extracted data of the recognition object input from the area-to-be-extracted extraction section 16. The area-to-be-extracted data is retained as a vector pattern having dimensions of the number of pixels with the intensity of each pixel of the area-to-be-extracted data as a component, for example. The retained area-to-be-extracted data is deformed appropriately by the image deformation section 64 and the deformed image is again retained in the image retention section 50.

The similarity degree calculation section 52 calculates the similarity degree between the area-to-be-extracted data retained in the image retention section 50 and the template image data of a previously specified reference object. The similarity degree can be represented using the Euclidean distance between the area-to-be-extracted data retained in the image retention section 50 and the template image data, namely, the distance between the square root of the sum of squares of the intensity difference between the corresponding pixels or the area-to-be-extracted data retained in the image retention section 50 and the subspace provided by approximating the distribution of the template image data pieces, or the like. For example, assuming that the reciprocal of the distance is the similarity degree, the smaller the distance, the larger the similarity degree. The similarity degree calculation section 52 can also serve as the estimation error evaluation section 62 described later.

The determination section 54 compares the similarity degree calculated by the similarity degree calculation section 52 with a predetermined threshold value. If the similarity degree is larger than the threshold value, the determination section 54 determines that the object being recognized is identical with the reference object.

Each of the image deformation degree estimation sections 68 makes estimation as to how much the area-to-be-extracted data retained in the image retention section 50 is deformed from the template image data with respect to different flexibility of image deformation. For example, position move, rotation, scaling, etc., can be named as the flexibility of image deformation. The image deformation degree estimation section 68 also evaluates the accuracy of the estimated image deformation and outputs the accuracy.

The image deformation sections 64 are provided in a one-to-one correspondence with the image deformation degree estimation sections 68 for deforming the area-to-be-extracted data retained in the image retention section 50 to bring the data close to the template image data. The flexibility of image deformation manipulation of the image deformation section 64 is the same as the image deformation flexibility of the corresponding image deformation degree estimation section 68, and the deformation manipulation amount is determined in response to the image deformation degree estimation value and its accuracy from the corresponding image deformation degree estimation section 68. The deformation manipulation amount is the image deformation degree estimation value multiplied by a deceleration factor. When an estimation value error is 0, the deceleration factor is 1, as an estimation value error becomes larger, the deceleration factor is brought close to 0. The image deformation manipulation is performed in the direction in which the area-to-be-extracted data retained in the image retention section 50 is brought close to the template image data. That is, the image retained in the image retention section 50 is brought close to the template image data by less image manipulation as the estimation error is smaller.

The image deformation arbitration section 66 arbitrates between image manipulation of one image deformation section 64 and that of another image deformation section 64 in response to the estimation value error of the image deformation degree estimation value sent from each image deformation degree estimation section 68. The image deformation arbitration section 66 allows the image deformation section 64 with the smallest value to operate preferentially. However, the image deformation arbitration section 66 does not allow the image deformation section 64 with the image deformation degree estimation value equal to or less than a given value to operate.

Next, the configuration of the image deformation degree estimation section 68 will be discussed in detail.

The feature pattern generation section 56 generates a feature pattern by executing predetermined conversion from the vector pattern representing the area-to-be-extracted data input from the image retention section 50. As the conversion method, for example, a method of projecting the vector pattern onto a finite number of base vectors having a large proper value provided by previously conducting principal component analysis on a large number of arbitrary image data pieces, a method of executing Fourier transform of the vector pattern, a method of performing wavelet transform of the vector pattern, etc., can be used.

The subspace projection calculation section 58 previously learns a subspace approximating the feature pattern distribution of reference object image. When a feature pattern of area-to-be-extracted data is input, the subspace projection calculation section 58 projects the feature pattern onto the subspace and outputs the coordinate values of the projection in the coordinate system on the subspace. Here, the projection vector of the feature pattern onto the subspace is defined as the point on the subspace nearest to the feature pattern. Since fluctuation of the feature pattern in the real world is very complicated, a nonlinear subspace is preferred for approximating the fluctuation.

The nonlinear subspace can be represented by a neural net called auto encoder, for example. The auto encoder is a kind of multilayer perceptron, the number of neurons of an input layer is the same as that of an output layer and the number of neurons of an intermediate layer is smaller than that of the input layer. The same value as the value input to the input layer is given to the neurons of the output layer as a teacher signal and the weight of each neural synapse is learnt so as to realize an equivalence map. The learning can be accomplished by usual back propagation.

Output of the output layer of the auto encoder learnt forms a nonlinear subspace approximating the learning sample distribution in n-dimensional space representing the input and output of the neurons of the intermediate layer of the auto encoder corresponds to the coordinate component in the coordinate system on nonlinear subspace 32. Therefore, output of the output layer when the feature pattern is input to the auto encoder learnt becomes projection of the feature pattern onto the nonlinear subspace, and the output of the neurons of the intermediate layer represents the projection vector in the coordinate system on the nonlinear subspace.

The deformation degree estimation section 60 previously learns the relationship between projection of the feature pattern onto the subspace, output from the subspace projection calculation section 58 and the image deformation degree and uses the relationship to find the image deformation degree from the projection value onto the subspace and outputs the found image deformation degree. As the relationship between projection onto the subspace and the image deformation degree, for example, the subspace is represented by an auto encoder with the number of neurons of the intermediate layer being two. The relationship between output of the neurons of the intermediate layer and the image deformation degree is retained in the deformation degree estimation section 60 as an approximate function or is retained in the storage section 3 as a lookup table.

The estimation error evaluation section 62 calculates distance d between the feature pattern and the nonlinear subspace and outputs the distance d as the accuracy of the image deformation degree estimated by the deformation degree estimation section 60. Here, the distance between the feature pattern and the nonlinear subspace is the Euclidean distance between the feature pattern and the projection vector of the feature pattern onto the nonlinear subspace, for example, if the nonlinear subspace is represented by an auto encoder, the distance can be represented by the Euclidean distance between input and output of the auto encoder. Since it can be assumed that as the distance between the feature pattern and the nonlinear subspace is smaller, the feature vector can be better approximated by the nonlinear subspace, it is adequate to use d as the accuracy of the image deformation degree. Of course, any desired monotone increasing function concerning d may be used.

Thus, the similarity degree determination section 18 determines the similarity degree and outputs the template image data most similar to the attention portion contained in the area to be extracted. That is, the output template image becomes an image determined having the highest similarity degree as the result of the individual authentication. Thus, since the similarity degree determination section 18 uses the feature vector of the area to be extracted for similarity determination, if the feature vector based on the attention portion cannot precisely be extracted, the accuracy of the similarity degree determination is not enhanced. This also applies at the stage of extracting the feature vector of each template image, if the feature vector of each template image cannot precisely be extracted, learning with good accuracy cannot be accomplished and the accuracy of recognition is not enhanced either, of course.

The processing will be discussed in more detail with a flowchart.

Figure 7:
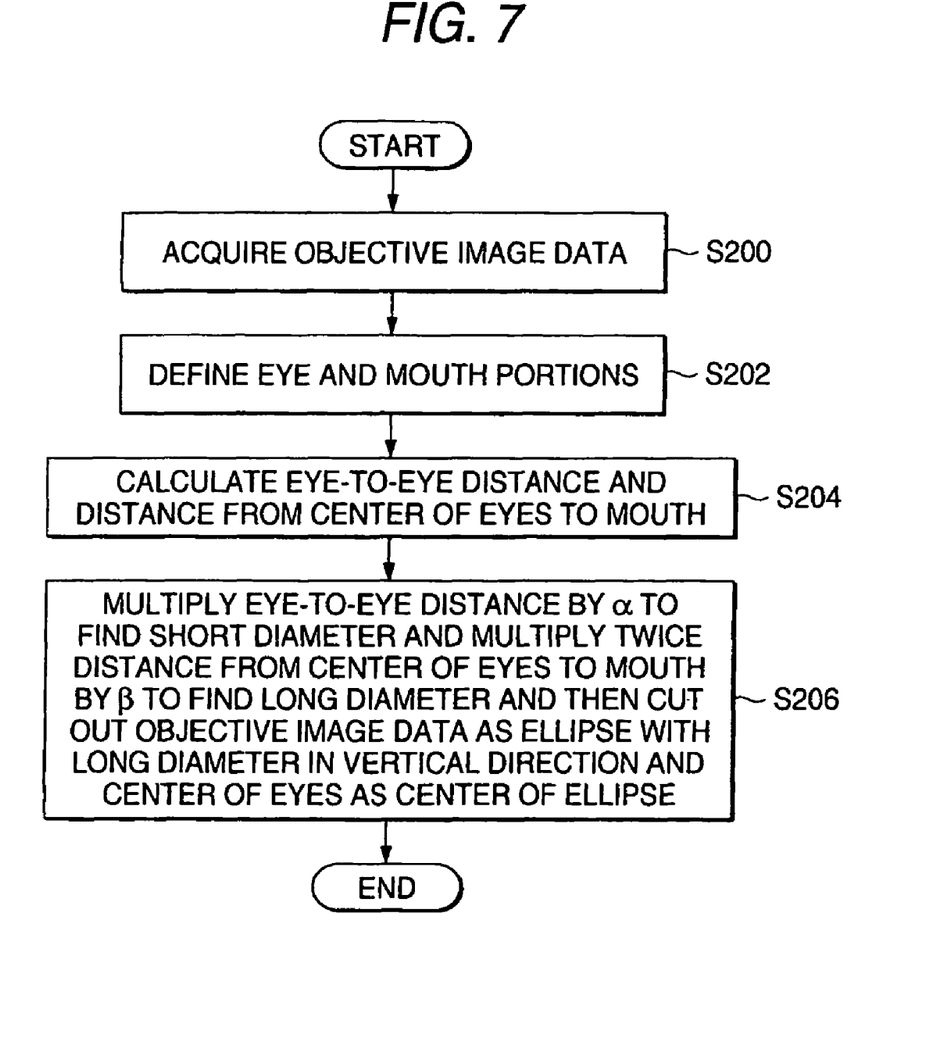
FIG. 7 is a flowchart of image recognition processing according to the embodiment of the invention.

FIG. 7 is a flowchart to show processing of the area-to-be-extracted extraction section 16 according to the embodiment of the invention. In the processing, first, objective image data is acquired (S200). Eye and mouth portions are defined (S202). Specifically, the eye and mouth portions can be defined from entropy calculation as described above. The eye-to-eye distance and the distance from the center of the left and right eyes to the mouth are calculated (S204). As the distance, for example, the center of gravity of the area determined to be the eye area or the mouth area is calculated by the entropy calculation described above and the distance from the center of gravity can be adopted. The eye-to-eye distance is multiplied by α to find a short diameter and twice the distance from the center of the left and right eyes to the mouth is multiplied by β to find a long diameter and then the objective image data is cut out as an ellipse with the long diameter in the vertical direction and the center of the left and right eyes as the center of the ellipse (S206), whereby the area to be extracted is extracted. That is, if the whole face of a human being is the attention portion, the center of the left and right eyes generally becomes the center of the face and therefore an ellipse with the center of the attention portion as the center of the ellipse is adopted. α and β are predetermined constants and it is desirable that α and β should take optimum values to extract the attention portion. Preferably, they are determined so that when the face image faces the front, a complete round is provided and that the whole face is contained and other portions than the face are contained as little as possible. Since the feature vector required for individual authentication may be able to be extracted, the area may be cut out so that only the necessary portion is contained as the attention portion in response to processing of the similarity degree determination section 18. For example, for individual authentication using only the eye, nose, and mouth positions as feature, the area may be cut out so as to contain the eyes, the nose, and the mouth. The portion to be cut out need not be an ellipse and may be a quadrangle, etc. The width of the area to be cut out is changed in response to the face inclination θ, so that the area to be cut does not contain other portions than the attention portion.

As θ is not used in the flowchart of FIG. 7, θ need not explicitly be calculated. If θ is not explicitly calculated, for example, taking the case in the flowchart of FIG. 7 as an example, it is equivalent to calculation as in expression (3), and the ratio between the aspect ratio of the image to be extracted when the attention portion faces the front and the aspect ratio of the image to be extracted, cut out in the flowchart of FIG. 7 finally is determined by the inclination θ.

(Expression 3)

$$(a'\alpha)/(2b'\beta)=((a\alpha)/(2b\beta))\times\cos\theta \quad (3)$$

Any other portion than the attention portion is excluded from the area to be extracted as described above, whereby the accuracy of learning and recognition of each template image data can be enhanced, so that the accuracy of individual authentication can be enhanced.

The invention is not limited to the embodiment described above.

For example, the invention can also be applied to any other than the case where the attention portion is a face image. That is, if the attention portion of the objective image data to be recognized is inclined in the depth direction, the effect of the inclination can be decreased. According to the invention, only the necessary portion can be extracted from the objective image data in response to the inclination of the attention portion in the depth direction thereof, so that the invention can be applied regardless of how the similarity degree determination processing is performed.

The image extraction apparatus may further include a feature area detection unit to detect plural feature areas contained in the objective image data, and the inclination estimation unit may estimate the inclination of the attention portion in the depth direction thereof based on the feature areas.

In the image extraction apparatus, the inclination estimation unit may estimate the inclination of the attention portion in the depth direction thereof based on relative positions of the plural feature areas.

In the image extraction apparatus, the width of the area to be extracted may be determined in response to the inclination estimated by the inclination estimation unit.

The entire disclosure of Japanese Patent Application No. 2004-125814 filed on Apr. 21, 2004 including specification, claims, drawings and abstract is incorporated herein by reference in its entirety.

What is claimed is:

1. An image recognition apparatus comprising:
   a processor;
   an objective image data acquisition unit to acquire objective image data containing a face image portion;
   a feature area detection unit to detect eye areas corresponding to left and right eyes contained in the objective image data;
   an inclination estimation unit to estimate inclination of the face image portion in a depth direction thereof based on the relative position of the detected eye areas;
   an area-to-be-extracted determination unit to determine a shape of an area to be extracted based on the inclination estimated by the inclination estimation unit; and
   an area-to-be-extracted extraction unit to extract the area to be extracted of the shape determined from the objective image data, wherein
   the area-to-be-extracted determination unit determines the shape of the area to be extracted in response to the inclination so that a width of the area to be extracted is smaller than a width of an area to be extracted in the case where the face image portion faces a front, and
   the area to be extracted is subjected to predetermined processing via the processor.

2. An image recognition apparatus comprising:
   a processor;
   an objective image data acquisition unit to acquire objective image data containing a face image portion;
   a feature area detection unit to detect eye areas corresponding to left and right eyes contained in the objective image data;
   an inclination estimation unit to estimate inclination of the face image portion in a depth direction thereof based on the relative position of the detected eye areas;
   an area-to-be-extracted determination unit to determine a shape of an area to be extracted based on the inclination estimated by the inclination estimation unit; and
   an area-to-be-extracted extraction unit to extract the area to be extracted of the shape determined from the objective image data, wherein
   the shape is an outline form which surrounds the area to be extracted based on the inclination of the face image portion, and
   the area to be extracted is subjected to predetermined processing via the processor.

* * * * *